United States Patent
Peroz et al.

(10) Patent No.: US 11,280,937 B2
(45) Date of Patent: Mar. 22, 2022

(54) ANTI-REFLECTIVE COATINGS ON OPTICAL WAVEGUIDES

(71) Applicant: Magic Leap, Inc., Plantation, FL (US)

(72) Inventors: Christophe Peroz, San Francisco, CA (US); Kevin Messer, Ft. Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 197 days.

(21) Appl. No.: 16/214,575

(22) Filed: Dec. 10, 2018

(65) Prior Publication Data
US 2019/0179057 A1 Jun. 13, 2019

Related U.S. Application Data

(60) Provisional application No. 62/751,240, filed on Oct. 26, 2018, provisional application No. 62/596,904, filed on Dec. 10, 2017.

(51) Int. Cl.
*G02B 1/115* (2015.01)
*G02B 27/01* (2006.01)
(Continued)

(52) U.S. Cl.
CPC .............. *G02B 1/115* (2013.01); *G02B 6/005* (2013.01); *G02B 6/0026* (2013.01);
(Continued)

(58) Field of Classification Search
CPC ........... G02B 1/11; G02B 1/113; G02B 1/115; G02B 6/005; G02B 6/0056; G02B 6/0075; G02B 27/0172
See application file for complete search history.

(56) References Cited

U.S. PATENT DOCUMENTS 4,344,092 A 8/1982 Miller
4,652,930 A 3/1987 Crawford
(Continued)

FOREIGN PATENT DOCUMENTS

EP 0535402 A1 4/1993
EP 1215522 A2 6/2002
(Continued)

OTHER PUBLICATIONS

Communication Pursuant to Article 94(3) EPC dated Sep. 4, 2019, European Patent Application No. 10793707.0, (4 pages).
(Continued)

*Primary Examiner* — Robert E. Tallman
(74) *Attorney, Agent, or Firm* — Stephen M. De Klerk

(57) ABSTRACT

An anti-reflective waveguide assembly comprising a waveguide substrate having a first index of refraction, a plurality of diffractive optical elements disposed upon a first surface of the waveguide and an anti-reflective coating disposed upon a second surface of the waveguide. The anti-reflective coating preferably increases absorption of light through a surface to which it is applied into the waveguide so that at least 97 percent of the light is transmitted. The anti-reflective coating is composed of four layers of material having different indices of refraction that the first index of refraction and an imaginary refractive index less than $1\times10^{-3}$ but preferably less than $5\times10^{-4}$.

22 Claims, 12 Drawing Sheets

(51) Int. Cl.
 *G02B 5/18* (2006.01)
 *F21V 8/00* (2006.01)
(52) U.S. Cl.
 CPC ....... *G02B 6/0076* (2013.01); *G02B 27/0172*
 (2013.01); *G02B 6/0065* (2013.01); *G02B*
 *2005/1804* (2013.01)

(56) References Cited

U.S. PATENT DOCUMENTS

| | | |
|---|---|---|
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,682,255 A | 10/1997 | Friesem et al. |
| 5,854,872 A | 12/1998 | Tai |
| 5,864,365 A | 1/1999 | Sramek et al. |
| 6,012,811 A | 1/2000 | Chao et al. |
| 6,016,160 A | 1/2000 | Coombs et al. |
| 6,076,927 A | 6/2000 | Owens |
| 6,117,923 A | 9/2000 | Amagai et al. |
| 6,124,977 A | 9/2000 | Takahashi |
| 6,191,809 B1 | 2/2001 | Hori et al. |
| 6,375,369 B1 | 4/2002 | Schneider et al. |
| 6,538,655 B1 | 3/2003 | Kubota |
| 6,541,736 B1 | 4/2003 | Huang et al. |
| 6,757,068 B2 | 6/2004 | Foxlin |
| 7,119,819 B1 | 10/2006 | Robertson et al. |
| 7,431,453 B2 | 10/2008 | Hogan |
| 7,542,040 B2 | 6/2009 | Templeman |
| 7,573,640 B2 | 8/2009 | Nivon et al. |
| 7,724,980 B1 | 5/2010 | Shenzhi |
| 7,751,662 B2 | 7/2010 | Kleemann |
| 7,758,185 B2 | 7/2010 | Lewis |
| 8,246,408 B2 | 8/2012 | Elliot |
| 8,353,594 B2 | 1/2013 | Lewis |
| 8,508,676 B2 | 8/2013 | Silverstein et al. |
| 8,547,638 B2 | 10/2013 | Levola |
| 8,619,365 B2 * | 12/2013 | Harris .................... G02B 1/115 |
| | | 359/586 |
| 8,696,113 B2 | 4/2014 | Lewis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,383,823 B2 | 7/2016 | Geisner et al. |
| 9,581,820 B2 | 2/2017 | Robbins |
| 9,658,473 B2 | 5/2017 | Lewis |
| 9,671,566 B2 | 6/2017 | Abovitz et al. |
| 9,671,615 B1 | 6/2017 | Vallius et al. |
| 9,696,795 B2 | 7/2017 | Marcolina et al. |
| 9,874,664 B2 | 1/2018 | Stevens et al. |
| 9,955,862 B2 | 5/2018 | Freeman et al. |
| 9,996,797 B1 | 6/2018 | Holz et al. |
| 10,018,844 B2 | 7/2018 | Levola et al. |
| 10,151,937 B2 | 12/2018 | Lewis |
| 10,185,147 B2 | 1/2019 | Lewis |
| 10,218,679 B1 | 2/2019 | Jawahar |
| 10,516,853 B1 | 12/2019 | Gibson et al. |
| 10,551,879 B1 | 2/2020 | Richards et al. |
| 10,578,870 B2 | 3/2020 | Kimmel |
| 10,825,424 B2 | 11/2020 | Zhang |
| 2001/0010598 A1 | 8/2001 | Aritake et al. |
| 2002/0063913 A1 | 5/2002 | Nakamura et al. |
| 2002/0071050 A1 | 6/2002 | Homberg |
| 2002/0122648 A1 | 9/2002 | Mule' et al. |
| 2002/0140848 A1 | 10/2002 | Cooper et al. |
| 2003/0048456 A1 | 3/2003 | Hill |
| 2003/0067685 A1 | 4/2003 | Niv |
| 2003/0077458 A1* | 4/2003 | Korenaga .............. G02B 1/115 |
| | | 428/432 |
| 2003/0219992 A1 | 11/2003 | Schaper |
| 2004/0001533 A1 | 1/2004 | Tran et al. |
| 2004/0021600 A1 | 2/2004 | Wittenberg |
| 2004/0042377 A1 | 3/2004 | Nikoloai et al. |
| 2004/0174496 A1 | 9/2004 | Ji et al. |
| 2004/0186902 A1 | 9/2004 | Stewart |
| 2004/0201857 A1 | 10/2004 | Foxlin |
| 2004/0240072 A1 | 12/2004 | Schindler et al. |
| 2004/0246391 A1 | 12/2004 | Travis |
| 2005/0001977 A1 | 1/2005 | Zelman |
| 2005/0157159 A1 | 7/2005 | Komiya et al. |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0038880 A1 | 2/2006 | Starkweather et al. |
| 2006/0050224 A1 | 3/2006 | Smith |
| 2006/0126181 A1 | 6/2006 | Levola |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0268220 A1 | 11/2006 | Hogan |
| 2007/0058248 A1 | 3/2007 | Nguyen et al. |
| 2007/0159673 A1 | 7/2007 | Freeman et al. |
| 2007/0188837 A1 | 8/2007 | Shimizu et al. |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0205838 A1 | 8/2008 | Crippa et al. |
| 2008/0316768 A1 | 12/2008 | Travis |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0310633 A1 | 12/2009 | Ikegami |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0296163 A1 | 11/2010 | Sarikko |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0113235 A1 | 5/2012 | Shintani |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0307075 A1 | 12/2012 | Margalitq |
| 2012/0314959 A1 | 12/2012 | White et al. |
| 2012/0320460 A1 | 12/2012 | Levola |
| 2012/0326948 A1 | 12/2012 | Crocco et al. |
| 2013/0050833 A1 | 2/2013 | Lewis et al. |
| 2013/0051730 A1 | 2/2013 | Travers et al. |
| 2013/0077170 A1 | 3/2013 | Ukuda |

(56) References Cited

U.S. PATENT DOCUMENTS

| | | |
|---|---|---|
| 2013/0094148 A1 | 4/2013 | Sloane |
| 2013/0169923 A1 | 7/2013 | Schnoll et al. |
| 2013/0278633 A1 | 10/2013 | Ahn et al. |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2014/0016821 A1 | 1/2014 | Arth et al. |
| 2014/0022819 A1 | 1/2014 | Oh et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1* | 5/2014 | Brown ............... G02B 27/0172 385/10 |
| 2014/0149573 A1 | 5/2014 | Tofighbakhsh et al. |
| 2014/0168260 A1 | 6/2014 | O'Brien et al. |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0359589 A1 | 12/2014 | Kodsky et al. |
| 2015/0005785 A1 | 1/2015 | Olson |
| 2015/0009099 A1 | 1/2015 | Queen |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0205126 A1 | 7/2015 | Schowengerdt |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0027215 A1 | 1/2016 | Burns et al. |
| 2016/0077338 A1 | 3/2016 | Robbins et al. |
| 2016/0085300 A1 | 3/2016 | Robbins et al. |
| 2016/0093099 A1 | 3/2016 | Bridges |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0061696 A1 | 3/2017 | Li et al. |
| 2017/0100664 A1 | 4/2017 | Osterhout et al. |
| 2017/0115487 A1 | 4/2017 | Travis |
| 2017/0122725 A1 | 5/2017 | Yeoh et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0185261 A1 | 6/2017 | Perez et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0232345 A1 | 8/2017 | Rofougaran et al. |
| 2017/0235126 A1 | 8/2017 | DiDomenico |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0254832 A1 | 9/2017 | Ho et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1* | 10/2017 | Stenberg ............. G02B 5/1814 |
| 2017/0307891 A1 | 10/2017 | Bucknor et al. |
| 2017/0312032 A1 | 11/2017 | Amanatullah et al. |
| 2017/0329137 A1 | 11/2017 | Tervo |
| 2017/0332098 A1 | 11/2017 | Rusanovskyy et al. |
| 2017/0357332 A1 | 12/2017 | Balan et al. |
| 2018/0014266 A1 | 1/2018 | Chen |
| 2018/0059305 A1* | 3/2018 | Popovich ............. G02B 6/0031 |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0131907 A1 | 5/2018 | Schmirier et al. |
| 2018/0136466 A1 | 5/2018 | Ko |
| 2018/0190017 A1 | 7/2018 | Mendez et al. |
| 2018/0191990 A1 | 7/2018 | Motoyama et al. |
| 2018/0250589 A1 | 9/2018 | Cossairt et al. |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1* | 2/2019 | Tervo ................. G02B 27/0172 |
| 2019/0087015 A1 | 3/2019 | Lam et al. |
| 2019/0101758 A1 | 4/2019 | Zhu et al. |
| 2019/0172216 A1 | 6/2019 | Ninan et al. |
| 2019/0178654 A1 | 6/2019 | Hare |
| 2019/0196690 A1 | 6/2019 | Chong et al. |
| 2019/0243123 A1 | 8/2019 | Bohn |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0309944 A1 | 10/2020 | Thoresen et al. |
| 2020/0356161 A1 | 11/2020 | Wagner |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0142582 A1 | 5/2021 | Jones et al. |
| 2021/0158627 A1 | 5/2021 | Cossairt et al. |

FOREIGN PATENT DOCUMENTS

| | | |
|---|---|---|
| EP | 1938141 A1 | 7/2008 |
| EP | 1943556 A2 | 7/2008 |
| EP | 3164776 B1 | 5/2017 |
| EP | 3236211 A1 | 10/2017 |
| EP | 2723240 B1 | 8/2018 |
| JP | 2003-029198 A | 1/2003 |
| JP | 2007-012530 A | 1/2007 |
| JP | 2009-244869 A | 10/2009 |
| JP | 2012-015774 A | 1/2012 |
| JP | 2016-85463 A | 5/2016 |
| JP | 6232763 B2 | 11/2017 |
| TW | 201803289 A | 1/2018 |
| WO | 2002/071315 A2 | 9/2002 |
| WO | 2006132614 A1 | 12/2006 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2013/049012 A1 | 4/2013 |
| WO | 2015143641 A1 | 10/2015 |
| WO | 2016/054092 A1 | 4/2016 |
| WO | 2017004695 A1 | 1/2017 |
| WO | 2017120475 A1 | 7/2017 |
| WO | 2018/044537 A1 | 3/2018 |
| WO | 2018087408 A1 | 5/2018 |
| WO | 2018166921 A1 | 9/2018 |

(56) References Cited

FOREIGN PATENT DOCUMENTS

| | | |
|---|---|---|
| WO | 2019148154 A1 | 8/2019 |
| WO | 2020010226 A1 | 1/2020 |

OTHER PUBLICATIONS

Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jun. 12, 2017, European Patent Application No. 16207441.3, (8 pages).
Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
Non Final Office Action dated Nov. 19, 2019, U.S. Appl. No. 16/355,611, (31 pages).
Non Final Office Action dated Aug. 21, 2019, U.S. Appl. No. 15/564,517, (14 pages).
Non Final Office Action dated Jul. 27, 2020, U.S. Appl. No. 16/435,933, (16 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Oct. 22, 2019, U.S. Appl. No. 15/859,277, (15 pages).
Notice of Allowance dated Mar. 25, 2020, U.S. Appl. No. 15/564,517, (11 pages).
Summons to attend oral proceedings pursuant to Rule 115(1) EPC dated Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Azom, , "Silica-Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>, (6 pages).
Goodfellow, , "Titanium Dioxide-Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>, (9 pages).
Levola, T. , "Diffractive Optics for Virtual Reality Displays", Journal of the SID Eurodisplay 14/05, 2005, XP008093627, chapters 2-3, Figures 2 and 10, pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Memon, F. et al., "Synthesis, Characterization and Optical Constants of Silicon Oxycarbide", EPJ Web of Conferences; Publication [online]. Mar. 23, 2017 [retrieved Feb. 19, 2020].<URL: https://www.epj-conferences.org/articles/epjconf/pdf/2017/08/epjconf_nanop2017_00002.pdf>; DOI: 10.1051/epjconf/201713900002, (8 pages).
Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http://fkohl.chbe.gatech.edu/sites/default/files/linked_files/publications/2011Decomposition%20of%20poly(propylene%20carbonate)%20with%20UV%20sensitive%20iodonium%20salts,pdf>; DOI: 10,1016/j.polymdegradstab.2010, 12.003, (17 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.

(56) References Cited

OTHER PUBLICATIONS

International Search Report and Written Opinion dated Feb. 28, 2019, International Patent Application No. PCT/US18/64686, (8 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
International Search Report and Written Opinion dated Sep. 4, 2020, International Patent Application No. PCT/US20/31036, (13 pages).
Invitation to Pay Additional Fees dated Sep. 24, 2020, International Patent Application No. PCT/US2020/043596, (3 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
Azuma, Ronald T., "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T., "Predictive Tracking for Augmented Reality", Department of Computer Science, Chapel Hill NC; TR95-007, Feb. 1995, 262 pages.
Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Jacob, Robert J., "Eye Tracking in Advanced Interface Design", Human-Computer Interaction Lab, Naval Research Laboratory, Washington, D.C., date unknown. 2003, pp. 1-50.
Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
European Search Report dated Oct. 15, 2020, European Patent Application No. 20180623.9, (10 pages).
Extended European Search Report dated Nov. 3, 2020, European Patent Application No. 18885707.2, (7 pages).
Extended European Search Report dated Nov. 4, 2020, European Patent Application No. 20190980.1, (14 pages).
Final Office Action dated Nov. 24, 2020, U.S. Appl. No. 16/435,933, (44 pages).
Non Final Office Action dated Nov. 5, 2020, U.S. Appl. No. 16/530,776, (45 pages).
"Phototourism Challenge", CVPR 2019 Image Matching Workshop. https://image matching-workshop. github.io., (16 pages).
Arandjelović, Relja et al., "Three things everyone should know to improve object retrieval", CVPR, 2012, (8 pages).
Battaglia, Peter W. et al., "Relational inductive biases, deep learning, and graph networks", arXiv:1806.01261, Oct. 17, 2018, pp. 1-40.
Berg, Alexander C et al., "Shape matching and object recognition using low distortion correspondences", In CVPR, 2005, (8 pages).
Bian, Jiawang et al., "GMS: Grid-based motion statistics for fast, ultra-robust feature correspondence.", In CVPR (Conference on Computer Vision and Pattern Recognition), 2017, (10 pages).
Brachmann, Eric et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Caetano, Tibério S et al., "Learning graph matching", IEEE TPAMI, 31(6):1048-1058, 200.
Cech, Jan et al., "Efficient sequential correspondence selection by cosegmentation", IEEE TPAMI, 32(9):1568-1581, Sep. 201.
Cuturi, Marco, "Sinkhorn distances: Lightspeed computation of optimal transport", NIPS, 2013, (9 pages).
Dai, Angela et al., "ScanNet: Richly-annotated 3d reconstructions of indoor scenes", In CVPR, arXiv:1702.04405v2 [cs.CV] Apr. 11, 2017, (22 pages).

Deng, Haowen et al., "PPFnet: Global context aware local features for robust 3d point matching", In CVPR, arXiv:1802.02669v2 [cs.CV] Mar. 1, 2018, (12 pages).
Detone, Daniel et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel et al., "Self-improving visual odometry", arXiv:1812.03245, Dec. 8, 2018, (9 pages).
Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai et al., "D2-net: A trainable CNN for joint detection and description of local features", CVPR, arXiv:1905.03561v1 [cs.CV] May 9, 2019, (16 pages).
Ebel, Patrick et al., "Beyond cartesian representations for local descriptors", ICCV, arXiv:1908.05547v1 [cs.CV] Aug. 15, 2019, (11 pages).
Fischler, Martin A et al., "Random sample consensus: a paradigm for model fitting with applications to image analysis and automated cartography", Communications of the ACM, 24(6): 1981, pp. 381-395.
Gilmer, Justin et al., "Neural message passing for quantum chemistry", In ICML, arXiv:1704.01212v2 [cs.LG] Jun. 12, 2017, (14 pages).
Hartley, Richard et al., "Multiple View Geometry in Computer Vision", Cambridge University Press, 2003, pp. 1-673.
Lee, Juho et al., "Set transformer: A frame-work for attention-based permutation-invariant neural networks", ICML, arXiv:1810.00825v3 [cs.LG] May 26, 2019, (17 pages).
Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).
Li, Yujia et al., "Graph matching networks for learning the similarity of graph structured objects", ICML, arXiv:1904.12787v2 [cs.LG] May 12, 2019, (18 pages).
Li, Zhengqi et al., "Megadepth: Learning single-view depth prediction from internet photos", In CVPR, fromarXiv: 1804.00607v4 [cs.CV] Nov. 28, 2018, (10 pages).
Loiola, Eliane M. et al., "A survey for the quadratic assignment problem", European journal of operational research, 176(2): 2007, pp. 657-690.
Lowe, David G., "Distinctive image features from scale-invariant keypoints", International Journal of Computer Vision, 60(2): 91-110, 2004, (28 pages).
Luo, Zixin et al., "ContextDesc: Local descriptor augmentation with cross-modality context", CVPR, arXiv:1904.04084v1 [cs.CV] Apr. 8, 2019, (14 pages).
Munkres, James, "Algorithms for the assignment and transportation problems", Journal of the Society for Industrial and Applied Mathematics, 5(1): 1957, pp. 32-38.
Ono, Yuki et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam et al., "Automatic differentiation in Pytorch", 31st Conference on Neural Information Processing Systems (NIPS 2017), Long Beach, CA, USA, (4 pages).
Peyré, Gabriel et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).
Qi, Charles R et al., "Pointnet: Deep Learning on Point Sets for 3D Classification and Segmentation", CVPR, arXiv:1612.00593v2 [cs.CV] Apr. 10, 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).

(56) References Cited

OTHER PUBLICATIONS

Raguram, Rahul et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).
Rocco, Ignacio et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages).
Sattler, Torsten et al., "SCRAMSAC: Improving RANSAC's efficiency with a spatial consistency filter", ICCV, 2009: 2090-2097., (8 pages).
Schonberger, Johannes L. et al., "Pixelwise view selection for un-structured multi-view stereo, Computer Vision—ECCV 2016: 14th European Conference, Amsterdam, The Netherlands, Oct. 11-14, 2016, Proceedings, Part III", pp. 501-518, 2016.
Schonberger, Johannes L. et al., "Structure-from-motion revisited", Proceedings of the IEEE Conference on Computer Vision and Pattern Recognition (CVPR), 2016, pp. 4104-4113, (11 pages).
Sinkhorn, Richard et al., "Concerning nonnegative matrices and doubly stochastic matrices.", Pacific Journal of Mathematics, 1967, pp. 343-348.
Thomee, Bart et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne et al., "Wide baseline stereo matching based on local, affinely invariant regions", BMVC, 2000, pp. 1-14.
Ulyanov, Dmitry et al., "Instance normalization: The missing ingredient for fast stylization", arXiv:1607.08022v3 [cs.CV] Nov. 6, 2017, (6 pages).
Vaswani, Ashish et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar et al., "Graph attention networks", ICLR, arXiv:1710.10903v3 [stat.ML] Feb. 4, 2018, (12 pages).
Villani, Cédric , "Optimal transport: old and new", vol. 338. Springer Science & Business Media, Jun. 2008, pp. 1-998.
Wang, Xiaolong et al., "Non-local neural networks", CVPR, arXiv:1711.07971v3 [cs.CV] Apr. 13, 2018, (10 pages).
Wang, Yue et al., "Deep Closest Point: Learning representations for point cloud registration", ICCV, arXiv:1905.03304v1 [cs.CV] May 8, 2019, (10 pages).
Wang, Yue et al., "Dynamic Graph CNN for learning on point clouds", ACM Transactions on Graphics, arXiv:1801.07829v2 [cs.CV] Jun. 11, 2019, (13 pages).
Yi, Kwang M. et al., "Learning to find good correspondences", CVPR, arXiv:1711.05971v2 [cs.CV] May 21, 2018, (13 pages).
Yi, Kwang Moo et al., "Lift: Learned invariant feature transform", ECCV, arXiv:1603.09114v1 [cs.CV] Jul. 29, 2016, (16 pages).
Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui et al., "Learning two-view correspondences and geometry using order-aware network", ICCV; aarXiv:1908.04964v1 [cs.CV] Aug. 14, 2019, (11 pages).
Zhang, Li et al., "Dual graph convolutional net-work for semantic segmentation", BMVC, 2019; arXiv:1909.06121v3 [cs.CV] Aug. 26, 2020, (18 pages).
Extended European Search Report dated Jan. 22, 2021, European Patent Application No. 18890390.0, (11 pages).
Extended European Search Report dated Mar. 4, 2021, European Patent Application No. 19768418.6, (9 pages).
Final Office Action dated Mar. 19, 2021, U.S. Appl. No. 16/530,776, (25 pages).
International Search Report and Written Opinion dated Feb. 12, 2021, International Application No. PCT/US20/60555, (25 pages).
International Search Report and Written Opinion dated Feb. 2, 2021, International PCT Patent Application No. PCT/US20/60550, (9 pages).
International Search Report and Written Opinion dated Dec. 3, 2020, International Patent Application No. PCT/US20/43596, (25 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Mar. 3, 2021, U.S. Appl. No. 16/427,337, (41 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract, pp. 1-6 and 9.
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http://lcdcl.umd.edu/papers/icra2012.pdf> entire document, (8 pages).
Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082>, entire document.
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document, pp. 253-260.
Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911.11763>, entire document.
Final Office Action dated Jun. 15, 2021, U.S. Appl. No. 16/928,313, (42 pages).
Non Final Office Action dated Jun. 10, 2021, U.S. Appl. No. 16/938,782, (40 Pages).
Molchanov, Pavlo et al., "Short-range FMCW monopulse radar for hand-gesture sensing", 2015 IEEE Radar Conference (RadarCon) (2015), pp. 1491-1496.
Communication Pursuant to Rule 164(1) EPC dated Jul. 27, 2021, European Patent Application No. 19833664.6 , (11 pages).
Extended European Search Report dated Jun. 30, 2021, European Patent Application No. 19811971.1 , (9 pages).
Extended European Search Report dated Jul. 16, 2021, European Patent Application No. 19810142.0 , (14 pages).
Extended European Search Report dated Jul. 30, 2021, European Patent Application No. 19839970.1 , (7 pages).
Extended European Search Report dated Sep. 28, 2021, European Patent Application No. 19845418.3 , (13 pages).
Final Office Action dated Sep. 17, 2021, U.S. Appl. No. 16/938,782, (44 pages).
Non Final Office Action dated Aug. 4, 2021, U.S. Appl. No. 16/864,721, (51 pages).
Non Final Office Action dated Jul. 9, 2021, U.S. Appl. No. 17/002,663, (43 pages).

(56) References Cited

OTHER PUBLICATIONS

Non Final Office Action dated Jul. 9, 2021, U.S. Appl. No. 16/833,093, (47 pages).
Non Final Office Action dated Jun. 29, 2021, U.S. Appl. No. 16/698,588 , (58 pages).
Non Final Office Action dated Sep. 20, 2021, U.S. Appl. No. 17/105,848 , (56 pages).
Non Final Office Action dated Sep. 29, 2021, U.S. Appl. No. 16/748,193 , (62 pages).
Giuseppe, Donato , et al. , "Stereoscopic helmet mounted system for real time 3D environment reconstruction and indoor ego—motion estimation", Proc. SPIE 6955, Head- and Helmet-Mounted Displays XIII: Design and Applications , 69550P.
Sheng, Liu , et al. , "Time-multiplexed dual-focal plane head-mounted display with a liquid lens" , Optics Letters, Optical Society of Amer I Ca, US, vol. 34, No. 11, Jun. 1, 2009 (Jun. 1, 2009), XP001524475, ISSN: 0146-9592 , pp. 1642-1644.

* cited by examiner

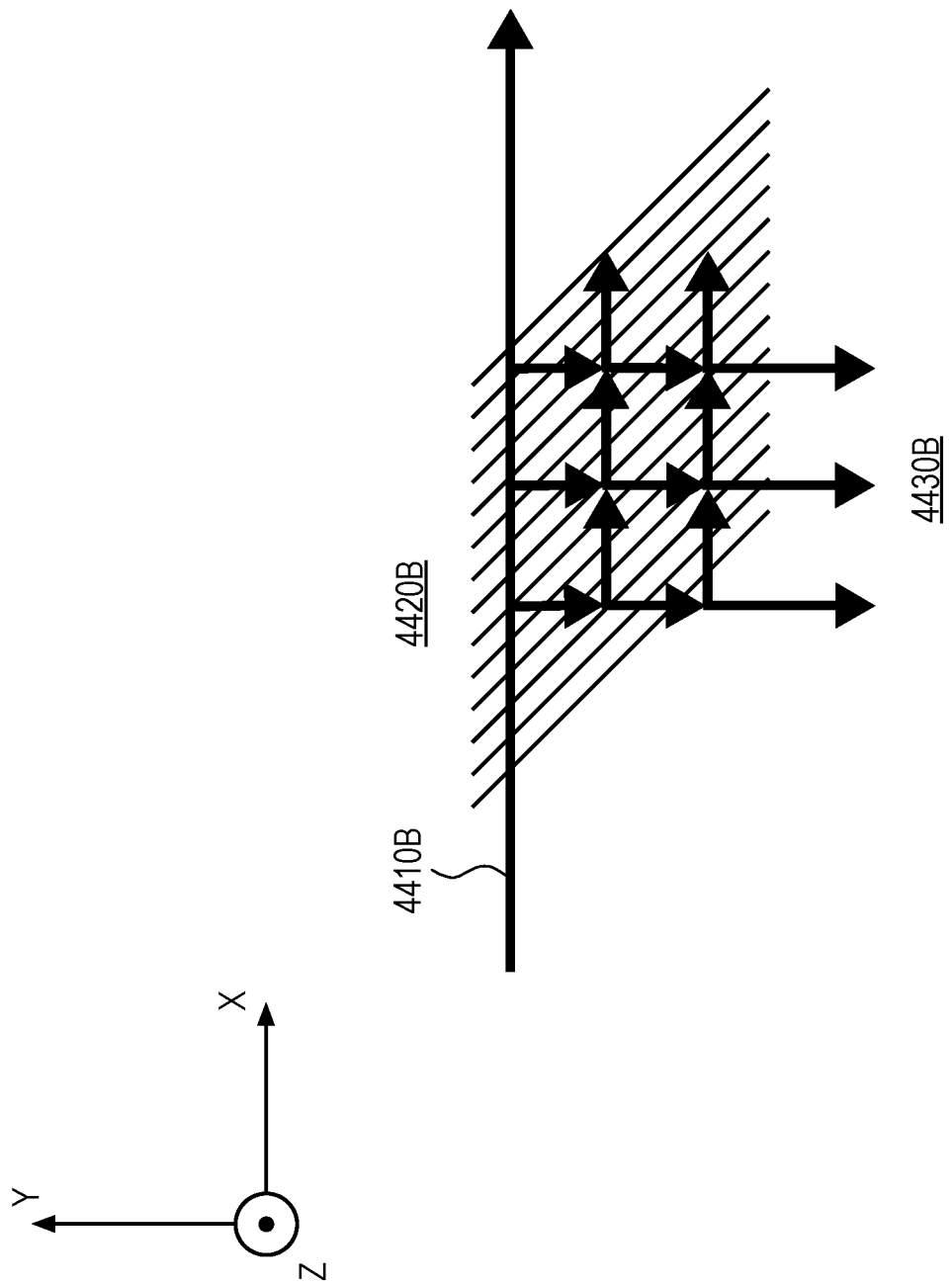

ANTI-REFLECTIVE COATINGS ON OPTICAL WAVEGUIDES

CROSS-REFERENCE TO RELATED APPLICATIONS

This application claims priority from U.S. Provisional Patent Application No. 62/596,904, filed on Dec. 10, 2017 and, U.S. Provisional Patent Application No. 62/751,240, filed on Oct. 26, 2018, each of which is incorporated herein by reference in their entirety

BACKGROUND OF THE INVENTION

Surface treatments of substrates such as windows or photovoltaic devices (e.g. solar energy panels) benefit from a coating of layered anti-reflective material. Reduction of glare from light impacting glass, improved retention of natural light for energy costs, or increased absorption of light impacting a photovoltaic cell are some of the ways anti-reflective coatings are used. Conventional anti-reflective coatings provide benefits for substantially orthogonal light paths, relative to normal of a surface of a substrate, but are generally directed to maximize anti-reflection for such freespace light that anticipates origination of light completely external to a substrate. Conventional coatings also seek to increase transmission rates. Certain optical mediums manipulate light paths other than freespace origination, and antireflection coatings to optimize the performance of such mediums are needed.

SUMMARY

Embodiments of the present invention are generally directed to specific materials and thicknesses of layers for anti-reflective coatings in optical waveguides. More specifically, the embodiments and techniques described herein relate to anti-reflective coatings that must facilitate light propagation for total internal reflection (TIR), and simultaneously minimize light reflection at orthogonal angles or other freespace light. Embodiments described herein are directed away from seeking complete transmission of light.

Some embodiments are directed to a waveguide substrate having a first index of refraction, such as glass. The substrate may be planar, or cylindrical (such as a fiber optic). For planar substrates, a plurality of diffractive optical elements, such as a grating, is disposed upon a first surface, and an anti-reflective coating is disposed upon the opposite surface. For cylindrical waveguides, an anti-reflective coating is applied to the outer surface.

In some embodiments, the waveguide is configured to receive light, and propagate it along an axis by total internal reflection. In planar waveguides, the light travels in along such an axis in a first direction, and outcouples light in a substantially orthogonal direction when the light reflects off of a diffractive optical element of that corresponding surface. In cylindrical waveguides, the light reflects along the waveguide along an axis substantially parallel to the length of the waveguides, and outcouples at a distal end.

The anti-reflective coating on such embodiments is configured to minimize the phase retardation as between the s and p polarization states of the received light, such that the angle of bounce by TIR for each polarization component of light is substantially similar.

In some embodiments, the anti-reflective coating is a single layer of magnesium fluoride ($MgF_2$) having a thickness between 75 and 125 nanometers (nm). In some embodiments, a layer of silica ($SiO_2$) is applied as an outer layer to the coating.

In some embodiments, the anti-reflective coating has an imaginary refractive index value (alternatively referred to herein as an absorption coefficient), k, less than $5 \times 10^{-4}$. In some embodiments the k value of the complete coating is between $5 \times 10^{-4}$ and $1 \times 10^{-3}$, regardless of the number of layers comprising the coating. In some embodiments, the coating is a single layer of material. In some embodiments, the coating alternates between two materials, with one material having a comparatively higher index of refraction than the second material. In some embodiments, less than eight total layers are utilized.

In some embodiments, titania ($TiO_2$) with an index of refraction greater than 2 is utilized as a coating layer material; in some embodiments, $SiO_2$ with an index of refraction between 1.45 and 1.58 alternates layers with titania.

These materials and layer selections optimize the efficiency of light output by an optical waveguide, minimize phase retardation to reduce optical defects such as striations in images output by such a waveguide, and minimize the labor and material cost of conventional layers.

BRIEF DESCRIPTION OF THE DRAWINGS

FIG. 5 is a front view showing an orthogonal pupil expander diffracting light across its span according to some embodiments.

DETAILED DESCRIPTION

Antireflection coatings are generally configured to create out-of-phase reflections across layers of material with differing indices of refraction. Conventionally, single-layer anti-reflective coatings seek a refractive index, n, equal to the square root of the coated substrate's index of refraction, and with a thickness, t, equal to one quarter the wavelength, λ, of the light targeted by the anti-reflective coating.

$$n_{coating} = \sqrt{(n_{substrate})} \qquad \text{Eq. 1}$$

$$t = \lambda_{target\ light}/(4 \cdot n_{coating}) \qquad \text{Eq. 2}$$

Figure 1:
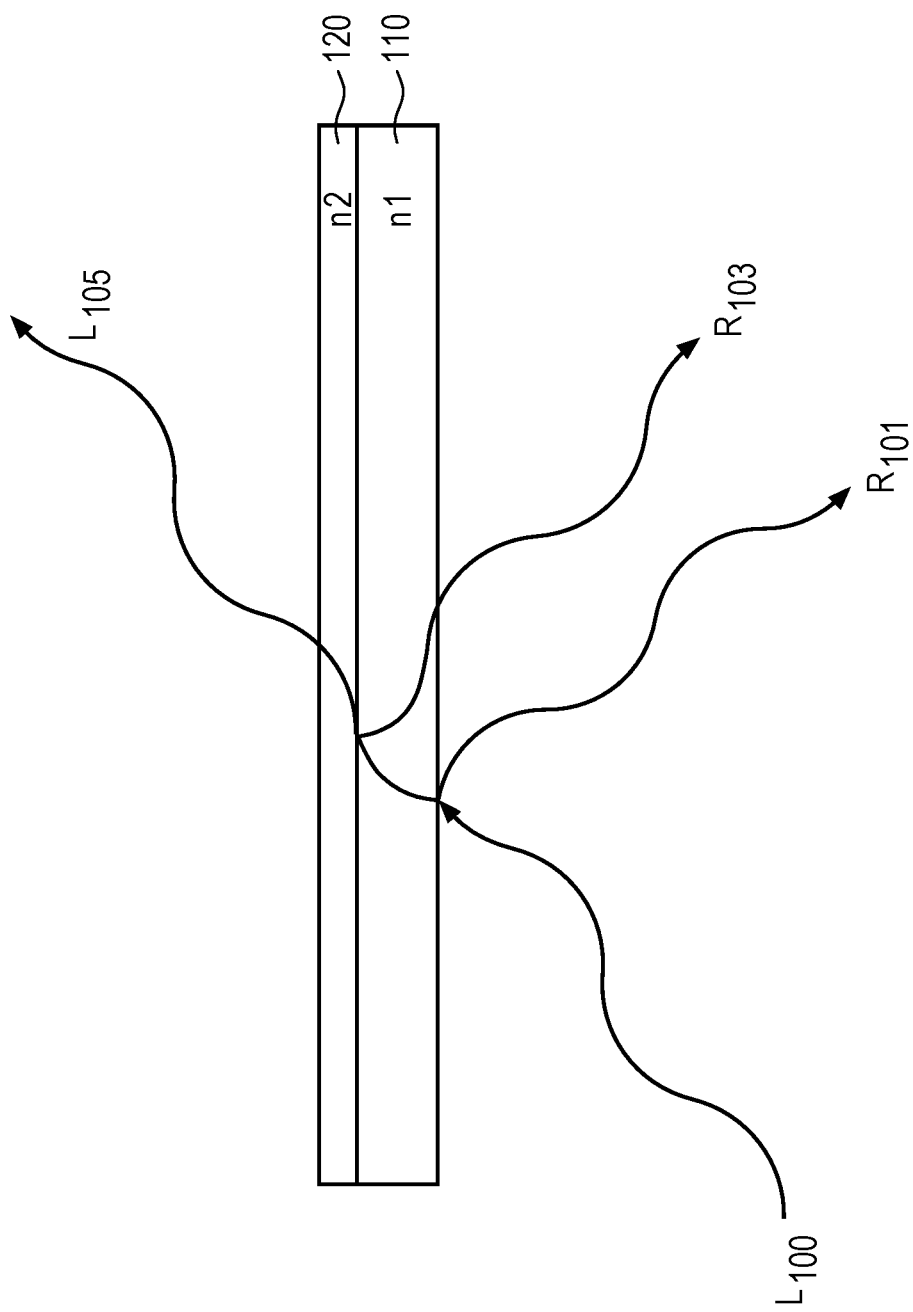
FIG. 1 is a top-down view showing an anti-reflective coating as understood with respect to its function to minimize reflected light and maximize absorption of light into a waveguide.

FIG. 1 depicts anti-reflection, with light L 100 impacting medium 110 and reflecting light R 101 while simultaneously transmitting to medium 120 and reflecting light R 103 that creates constructive interference with light R 101; remaining light L 105 transmits into medium 103. Many variations to improve the total amount of transmitted light L 105 are known. For example, broad band anti-reflection to improve transmission of multiple wavelengths with a single coating is achieved with additional and/or varying thickness layers.

Though the coating arrangement show in FIG. 1 may work as intended for freespace light, some optical systems employ waveguide technology; augmented or mixed reality system in particular maximize this technology in exit pupil expander systems to deliver light from a source and propagate that light through waveguides by TIR and then outcouple towards a user's eye.

Figure 2:
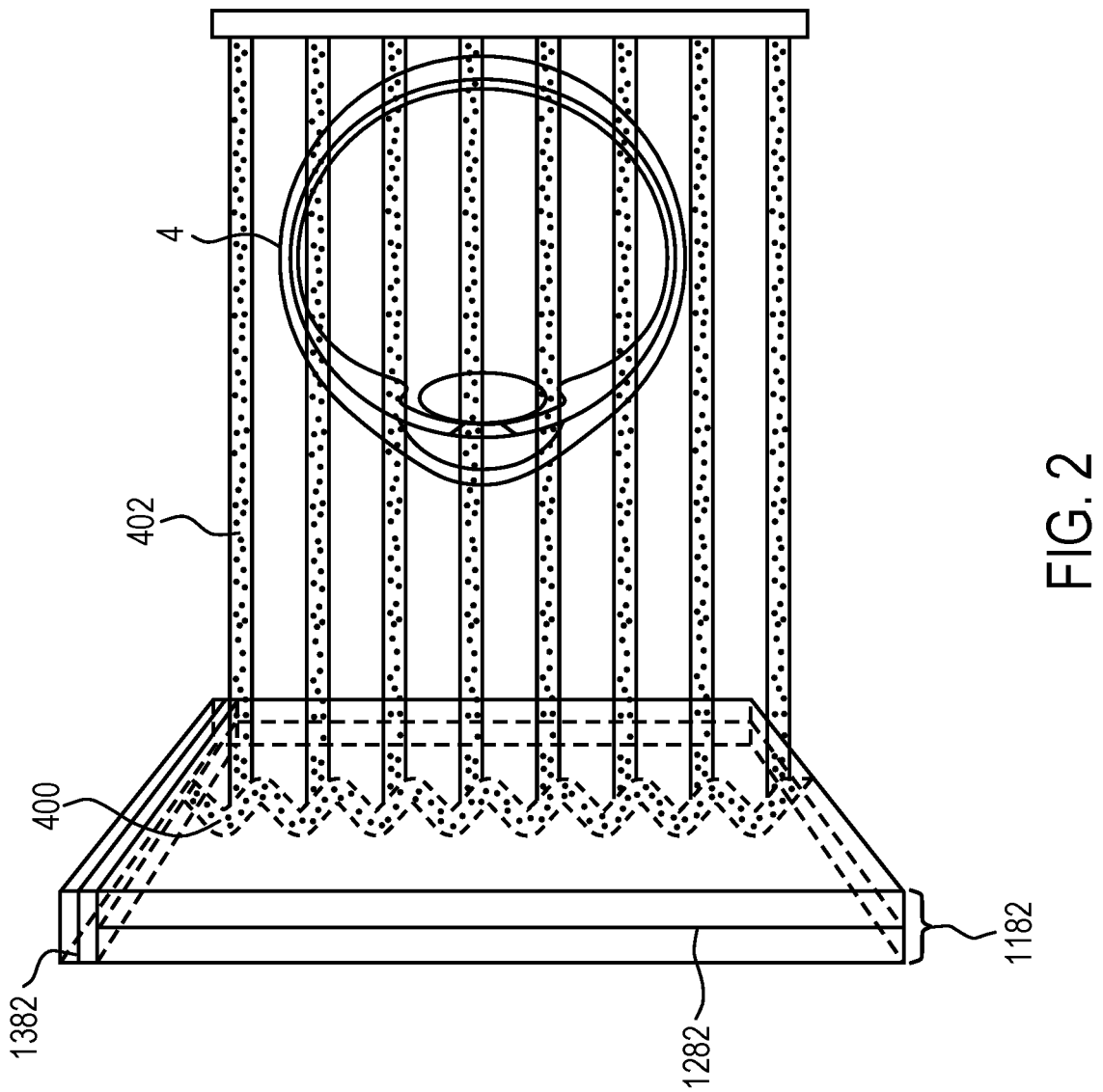
FIG. 2 is a top-down view showing a planar waveguide outcoupling a plurality of beams that propagate through the waveguide by total internal reflection according to some embodiments.

FIG. 2 shows a simplified version of such a system. One waveguide is illustrated, but it will be appreciated that other waveguides stacked together (as further described below with reference to FIG. 3) may function similarly. Light 400 is injected into the waveguide 1182 at an input surface 1382 of the waveguide 1182 and propagates within the waveguide 1182 by TIR. The input surface 1382 may be an incoupling grating formed by diffractive optical elements to diffract light 400 into the waveguide 1382 at angles supporting TIR. At points where the light 400 impinges upon outcoupling diffractive optical elements 1282, sampled portions exit the waveguide as a plurality of exit beams 402.

Each exit beam is a sampled beamlet of light 400 and increases the likelihood that any one sampled beamlet will be viewed by an eye 4 of a viewer. It is critical therefore that the waveguide 1182 maintains TIR to create the plurality of exit beams across its span, otherwise the exit beams 402 would not be distributed, and the resulting exit pupil(s) would only be viewable in certain positions of eye 4, limiting the applicability and flexibility of the system.

Figure 3:
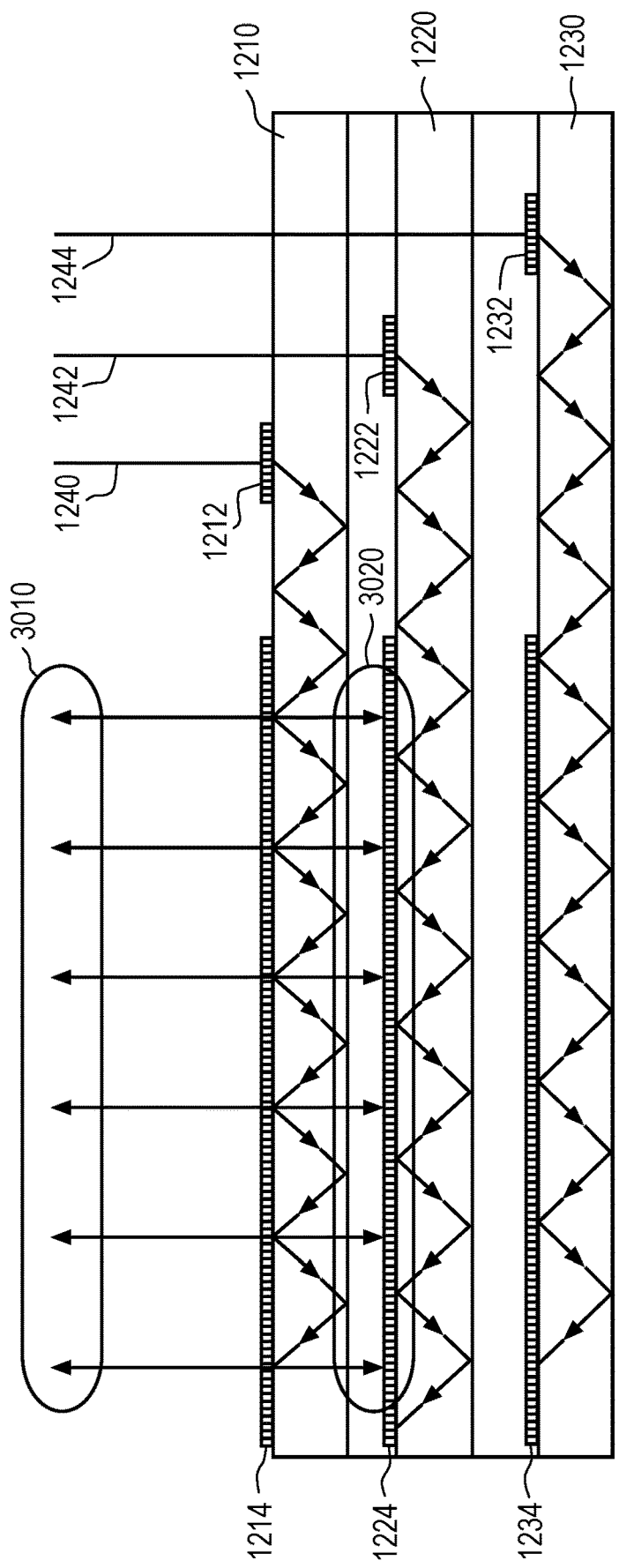
FIG. 3 is a top-down view showing a multi-waveguide stack outcoupling a plurality of beams as light bundles according to some embodiments.

FIG. 2 depicts a single waveguide system, but one of skill in the art will appreciate that if single waveguide 1182 imparts sampled portions of light 400, additional waveguides performing similar functions may impart additional sampled portions to create rich light effects such as multi-color component images or depth perception. FIG. 3 illustrates such a multi-layered system with three waveguides 1210, 1220, and 1230 propagating light by TIR. As each light path 1240, 1242 and 1244 respectively incouples at locations 1212, 1222, and 1232 impact a respective outcoupling diffractive optical element 1214, 1224, or 1234 (outcoupled light from paths 1222 and 1232 not depicted) disposed upon waveguide 1210, 1220, and 1230, it diffracts a plurality of beamlets in two directions: one towards the viewer (as in eye 4 of FIG. 2) represented by light bundle 3010, and one in a direction away from the viewer represented by light bundle 3020.

The light bundle 3020 may cause undesirable effects if it reflects off of the subsequent waveguide 1220, such as interference with light bundle 3010, increased blurriness due to any change in angle that may result from the reflection, etc. Here, an anti-reflective coating applied to the opposite surface of a waveguide from its outcoupling diffractive optical element will be beneficial to reduce these effects. A conventional coating that attempts to increase transmission generally will, however, degrade the light paths 1240, 1242, and 1244 as they progress across waveguides 1210, 1220, and 1230 by TIR. This degradation introduces uniformity complications at outcoupling, and results in poor image quality.

Figure 4:
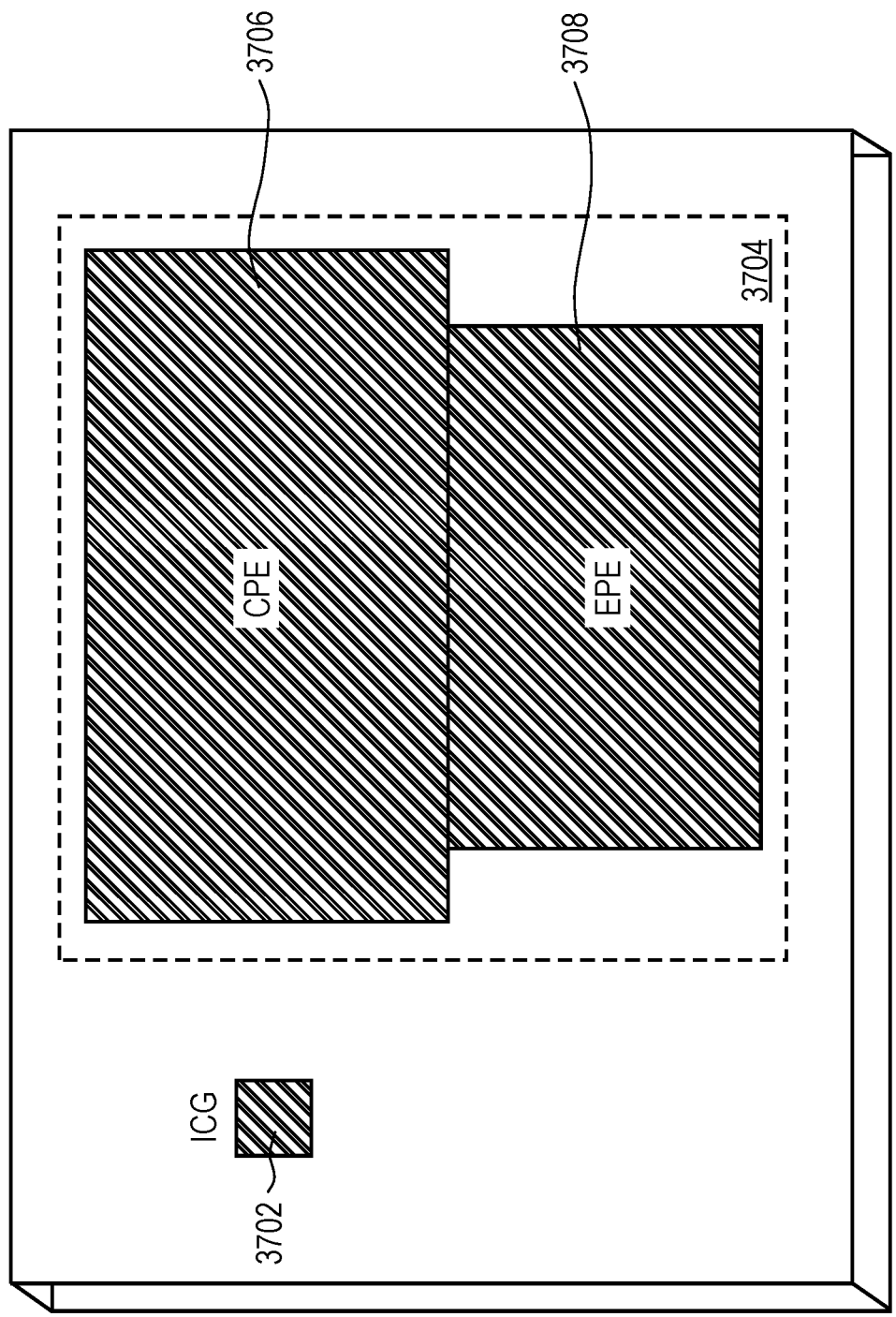
FIG. 4 is a front view of a planar waveguide having three diffractive optical element regions according to some embodiments.

Waveguide optical systems that employ pupil expander technology aggravate this problem. In a pupil expander system, such as depicted in FIG. 2, not only is light distributed in the substantially vertical direction, but also in an orthogonal direction to the exit beam path. FIG. 4 depicts an orthogonal pupil expander (OPE) 3706 disposed upon a waveguide 3704. FIG. 4 also depicts an exit pupil expander (EPE) 3708 for outcoupling progressive exit beams of TIR light, similar to outcoupling diffractive optical elements 1282 depicted in FIG. 2, and an incoupling grating (ICG) 3702 similar to the input surface 1382 of FIG. 2. In the waveguide system of FIG. 4, light incouples to the waveguide through the incoupling grating and diffracts towards the orthogonal pupil expander.

FIG. 5 depicts light sampling across the orthogonal pupil expander. Light 4410B from the incoupling grating of FIG. 4 encounters a grating 4420B, such as a series of diffractive optical elements, that diffracts samples of light in a first direction and a sample 4430B of that same light in a second direction; the particular directions diffracted are a function of the particular geometries of the diffractive optical element.

Figure 6A:
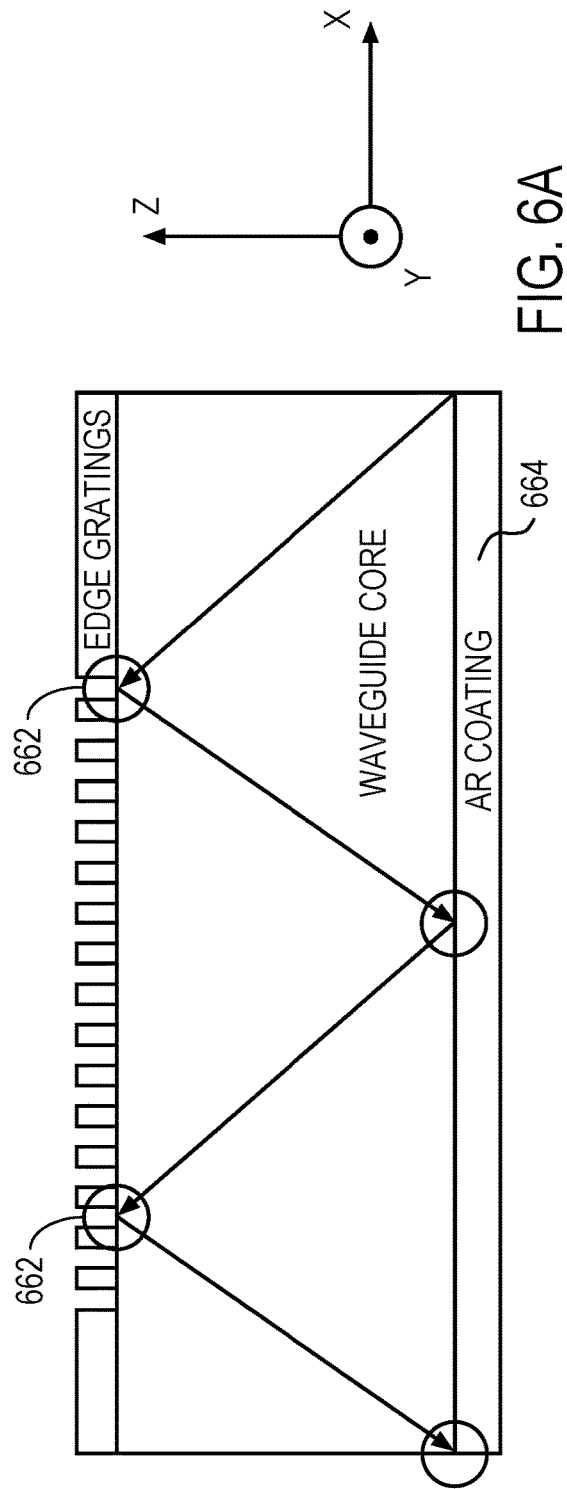
FIG. 6A is a top-down view showing a plurality of light bounces through a waveguide according to some embodiments.
Figure 6B:
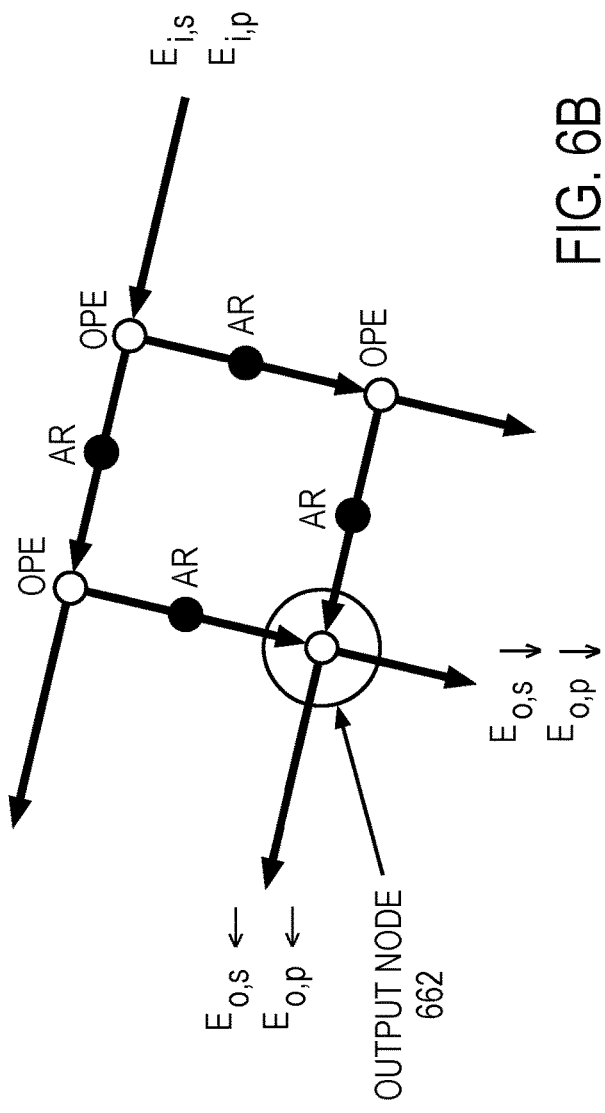
FIG. 6B is a front view of an inferometer network of energy transmitted through a waveguide configured to support total internal reflection according to some embodiments.

FIG. 6A depicts a cross-sectional view of this light path, one a waveguide comprising a grating 662 on one surface, and an anti-reflective coating 664 on the opposite surface. As light propagates by TIR through the waveguide, it alternatively reflects against the orthogonal pupil expander, and a surface opposite the orthogonal pupil expander. One of skill in the art will appreciate that a similar functionality occurs with the exit pupil expander region of the waveguide. To reduce the reflections described by light bundle 3020 in reference to FIG. 3, an anti-reflective coating is applied to this opposite surface. A cumulative light inferometer may be derived from this interaction, such as the unit cell inferometer depicted by FIG. 6B. In FIG. 6B, each interaction with the orthogonal pupil expander will sample the light into two paths, with a reflection against the anti-reflective coating side between each successive reflection against the orthogonal pupil expander. Each reflection off of the orthogonal pupil expander side or the anti-reflection side may further introduce polarization changes to the light, such that each successive bounce perturbs the polarization state and changes the energy at each output node.

By breaking down the polarization into the constituent s and p states, the resulting electric field, E, is a function of amplitude, A, and phase, φ, of the light, and is depicted for each s and p path as follows:

$$E_{i,s} = A_{i,s} e^{j\phi_{i,s}} \qquad \text{Eq. 3}$$

$$E_{i,p} = A_{i,p} e^{j\phi_{i,p}} \qquad \text{Eq. 4}$$

where i indicates the variables' value at input.

Each interaction (indicated by a directionality arrow below with correlation to the paths of the light at an output node of FIG. 6B) may be described as a 2×2 matrix multiplied by the energy of the s and p elements of Eq. 3 and Eq. 4. Such that $$\begin{bmatrix} E_{o,s\downarrow} \\ E_{o,p\downarrow} \end{bmatrix} = \begin{bmatrix} \sqrt{\eta_{s\downarrow s\leftarrow}} e^{j\phi_{s\downarrow s\leftarrow}} & \sqrt{\eta_{s\downarrow p\leftarrow}} e^{j\phi_{s\downarrow p\leftarrow}} \\ \sqrt{\eta_{p\downarrow s\leftarrow}} e^{j\phi_{p\downarrow s\leftarrow}} & \sqrt{\eta_{p\downarrow p\leftarrow}} e^{j\phi_{p\downarrow p\leftarrow}} \end{bmatrix} \begin{bmatrix} E_{i,s\leftarrow} \\ E_{i,p\leftarrow} \end{bmatrix} = \quad \text{Eq. 5}$$

$$OPE_{\downarrow\leftarrow} \begin{bmatrix} E_{i,s\leftarrow} \\ E_{i,p\leftarrow} \end{bmatrix}$$

where the left and downward are indicative of light diffracting to the left and down, as at output node 662 of FIG. 6B, and where η is the diffraction efficiency of the transition and φ is the phase shift of the transition.

Additionally, each bounce off the AR coating can be described by a 2×2 matrix. In a planar coating, the off-diagonal elements of this matrix are 0, and the magnitude of the diagonal elements must be 1 due to the fact that, in a planar coating, the layers are parallel. Because there is no diffraction from the AR coating, there are only two of these matrices: $AR_{\downarrow\downarrow}$ and $AR_{\leftarrow\leftarrow}$.

$$AR_{\downarrow\downarrow} = \begin{bmatrix} e^{j\theta_{s\downarrow s\downarrow}} & 0 \\ 0 & e^{j\phi_{p\downarrow p\downarrow}} \end{bmatrix} \quad \text{Eq. 6}$$

$$AR_{\leftarrow\leftarrow} = \begin{bmatrix} e^{j\theta_{s\leftarrow s\leftarrow}} & 0 \\ 0 & e^{j\theta_{p\leftarrow p\leftarrow}} \end{bmatrix} \quad \text{Eq. 7}$$

The electric field state leaving the output node propagating downward (towards an exit pupil expander) can now be related to the electric field input state.

$$\begin{bmatrix} E_{o,s\downarrow} \\ E_{o,p\downarrow} \end{bmatrix} = (OPE_{\downarrow\downarrow} AR_{\downarrow\downarrow} OPE_{\downarrow\leftarrow} AR_{\leftarrow\leftarrow} OPE_{\leftarrow\leftarrow} + \quad \text{Eq. 8}$$

$$OPE_{\downarrow\leftarrow} AR_{\leftarrow\leftarrow} OPE_{\leftarrow\downarrow} AR_{\downarrow\downarrow} OPE_{\downarrow\leftarrow}) \begin{bmatrix} E_{i,s} \\ E_{i,p} \end{bmatrix}$$

However, this may be simplified if the phase retardation (the difference between phase shifts of each of the s and p light paths at each bounce) is 0, such that ($\theta_s = \theta_p$). In this case, the anti-reflective coating no longer impacts the energy output. In other words, Eq. 6 and Eq. 7 may be replaced, respectively by:

$$AR_{\downarrow\downarrow} = e^{j\theta_{\downarrow\downarrow}} \begin{bmatrix} 1 & 0 \\ 0 & 1 \end{bmatrix} \quad \text{Eq. 9}$$

$$AR_{\leftarrow\leftarrow} = e^{j\theta_{\leftarrow\leftarrow}} \begin{bmatrix} 1 & 0 \\ 0 & 1 \end{bmatrix} \quad \text{Eq. 10}$$

And the output is simplified to:

$$\begin{bmatrix} E_{o,s\downarrow} \\ E_{o,p\downarrow} \end{bmatrix} = \quad \text{Eq. 11}$$

$$e^{j\theta_{\downarrow\downarrow}} e^{j\theta_{\leftarrow\leftarrow}} (OPE_{\downarrow\downarrow} OPE_{\downarrow\leftarrow} OPE_{\leftarrow\leftarrow} + OPE_{\downarrow\leftarrow} OPE_{\leftarrow\downarrow} OPE_{\downarrow\leftarrow})$$

$$\begin{bmatrix} E_{i,s} \\ E_{i,p} \end{bmatrix}$$

Figure 7:
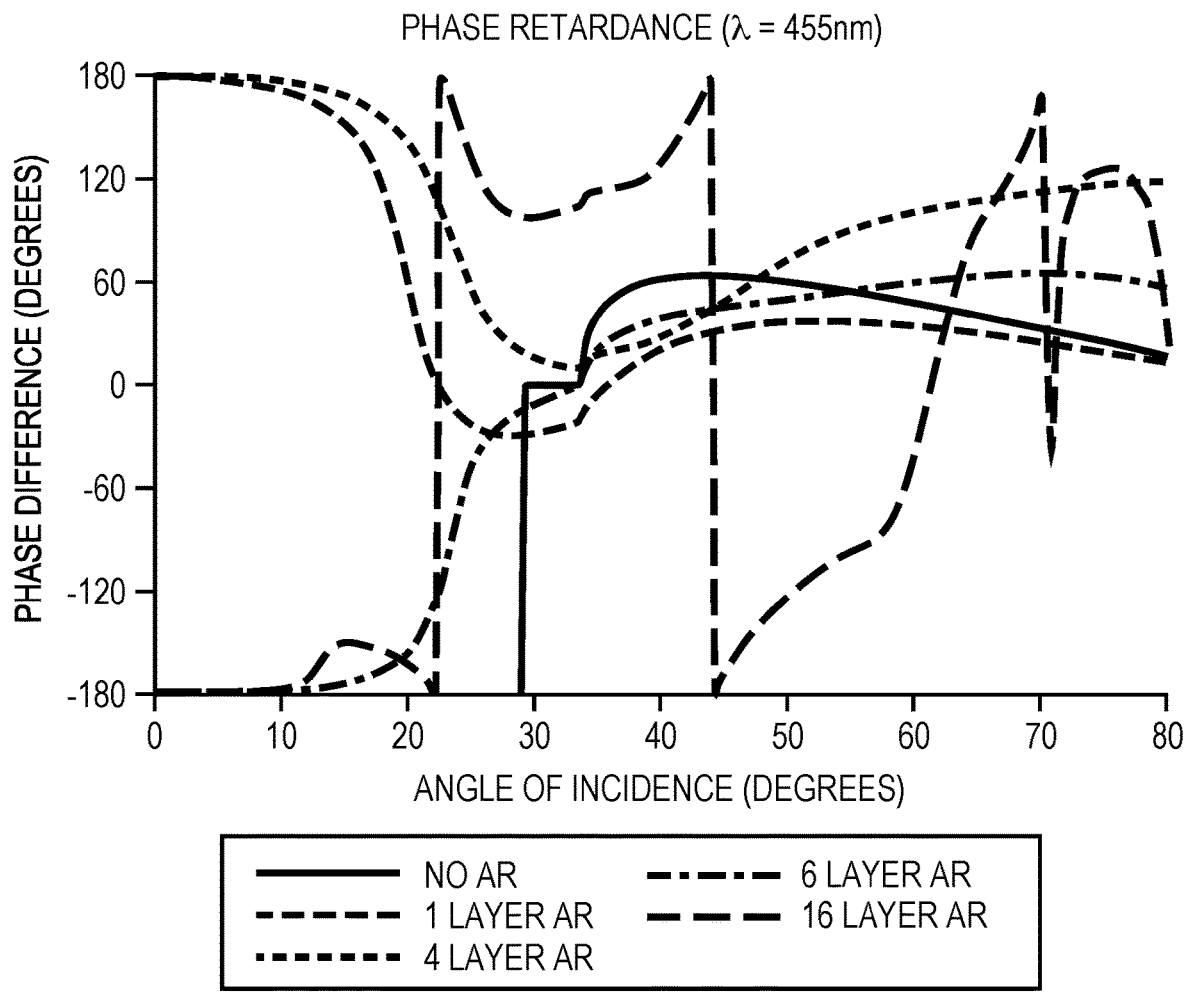
FIG. 7 is a graph illustrating a phase retardation relationship as a function of layers in an anti-reflective coating according to some embodiments.
Figure 8A:
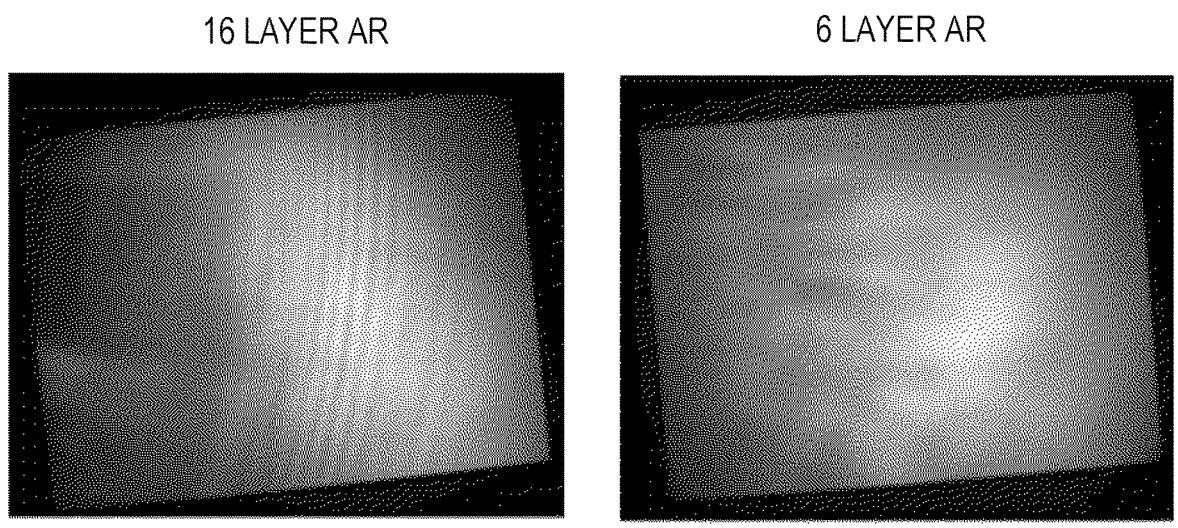
FIG. 8A shows captured images of an eyepiece design for blue (455 nm) light on substrates with different n values of layers of an anti-reflective coating.
Figure 8B:
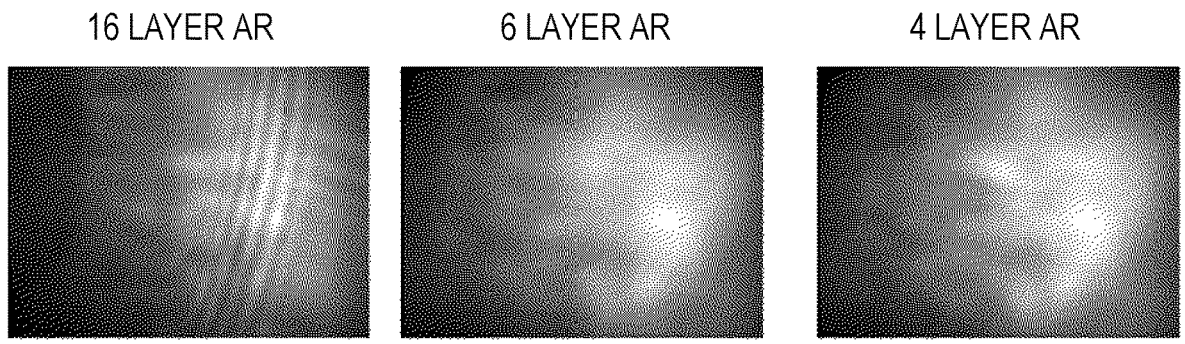
FIG. 8B shows simulated images of an eyepiece design for blue (455 nm) light on substrates with different n values of layers of an anti-reflective coating.
Figure 8C:
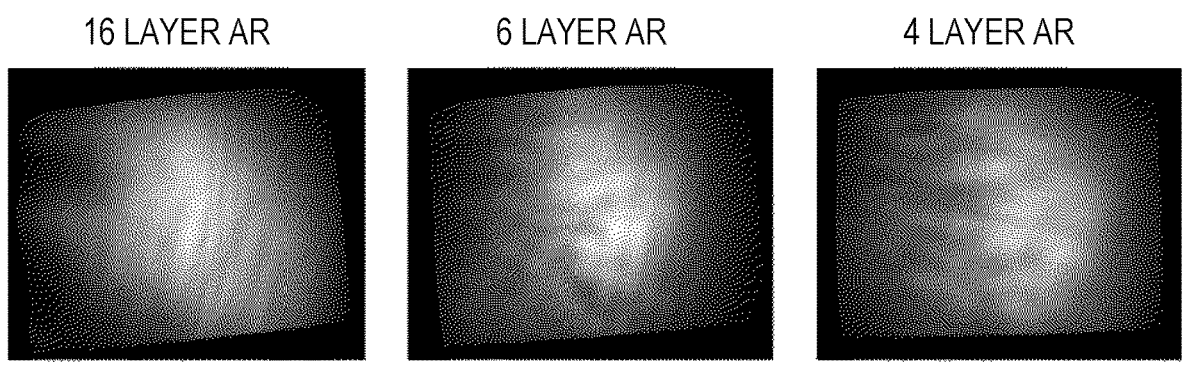
FIG. 8C shows captured images an eyepiece design for red (625 nm) light on substrates with different n values of layers of an anti-reflective coating.
Figure 8D:
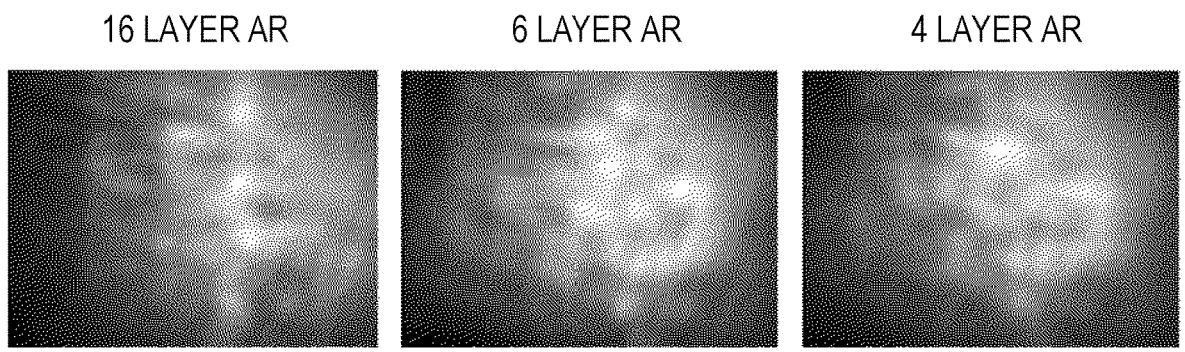
FIG. 8D shows simulated images an eyepiece design for red (625 nm) light on substrates with different n values of layers of an anti-reflective coating.

Therefore, if the AR coating has no phase retardation, it only imparts a phase shift to the output, with no change of polarization state or magnitude. If the AR coating does have phase retardation, it will change the output polarization state and magnitude, and introduce negative optical effects. This is critical when determining the number of layers of an anti-reflective coating used on a TIR waveguide display device. FIG. 7 depicts the phase retardation for TIR light at various angles of incidence. FIG. 8A shows captured images of an eyepiece design for blue (455 nm) light on substrates with different n values of layers of an anti-reflective coating. FIG. 8B shows simulated images of an eyepiece design for blue (455 nm) light on substrates with different n values of layers of an anti-reflective coating. FIG. 8C shows captured images an eyepiece design for red (625 nm) light on substrates with different n values of layers of an anti-reflective coating. FIG. 8D shows simulated images an eyepiece design for red (625 nm) light on substrates with different n values of layers of an anti-reflective coating. Large variation in phase difference impact the exit beams, observable as "striations" or uniformity disruptions depicted in FIGS. 8A-8D. A four-layer anti-reflective coating is found to have the most uniformity and is thus preferred over the other coatings that are represented in FIGS. 7 and 8A-8D. It will be appreciated that the effects of adjusting the number of anti-reflective layers are consistent across each wavelength, that is, though FIGS. 8A-8D depict eyepieces for particular wavelengths of light the effect is similar for other wavelengths (such as green) that are not shown.

To minimize this degradation and reduce the amount of inter-waveguide reflections while nonetheless maintaining intra-waveguide reflections, embodiments of the present invention are directed to an optimized anti-reflective coating. Such optimization balances the index of refraction of the anti-reflective material with the number and thickness of layers applied in the coating. This will minimize the phase retardation effects by bringing $\theta_s$ substantially equal to $\theta_p$.

In some embodiments an anti-reflective coating is applied to one side of a waveguide substrate within a waveguide stack that makes up an eyepiece of an augmented or mixed or virtual reality device. Preferably, the coated side is on the opposing side a viewer's eye is expected to be placed, though a coated side on a same side as a viewer's eye may function similarly. In some embodiments, a grating is applied to the opposite surface of the waveguide as the coated side. The anti-reflective coating preferably reduces reflection from and increases transmission through the surface to which the anti-reflective coating is applied. The anti-reflective coating preferably increases transmission of light to at least 97 percent.

The antireflection coating comprises at least one layer, but in preferred embodiments is less than eight and alternates layers of two alternating constituent materials of comparatively high and comparatively low indices of refraction. In some embodiments, one of the constituent layers is titania ($TiO_2$). In some embodiments, one of the constituent layers is silica ($SiO_2$).

One of skill in the art will appreciate other candidate materials, such as SiN, $ZrO_2$, $ZnO_2$, $Ta_2O_5$, or $NB_2O_5$ or other metal oxides with low absorption in visible wavelength range. Such materials, as with $TiO_2$ and $SiO_2$, are well known in the art for their use in the photovoltaic or glass treatment for anti-reflection.

In some embodiments, $SiO_2$ is a final (i.e. top) layer of a multilayer coating as a protective layer to any wet chemistry (sulfuric acid, hydrogen peroxide, etc.) incident to waveguide cleaning, processing or patterning.

An index of refraction, n, of a material is composed from two elements, the known refractive index and the absorption coefficient k (or imaginary index of refraction that relates to the attenuation of light through the material) such that n=n+ik. Different materials have different absorption coefficients that can produce widely various results, and this is especially variable when multiple materials are layered together to create a net k value for the coating. For example, titania, a well know anti-reflective material, and silicon nitride SiN have similar reflectance spectrums for normal incidence, but slightly different k values. Though these may be negligible in normal/orthogonal light directions, at angles supporting TIR every bounce of the light at a surface is attenuated with a slightly different absorption as compared between the two materials. The cumulative effect of this slight difference of absorption coefficient in a coating that manipulates light across a plurality of bounces in a TIR system can drastically affect the overall image quality, especially uniformity and efficiency.

Figure 9A:
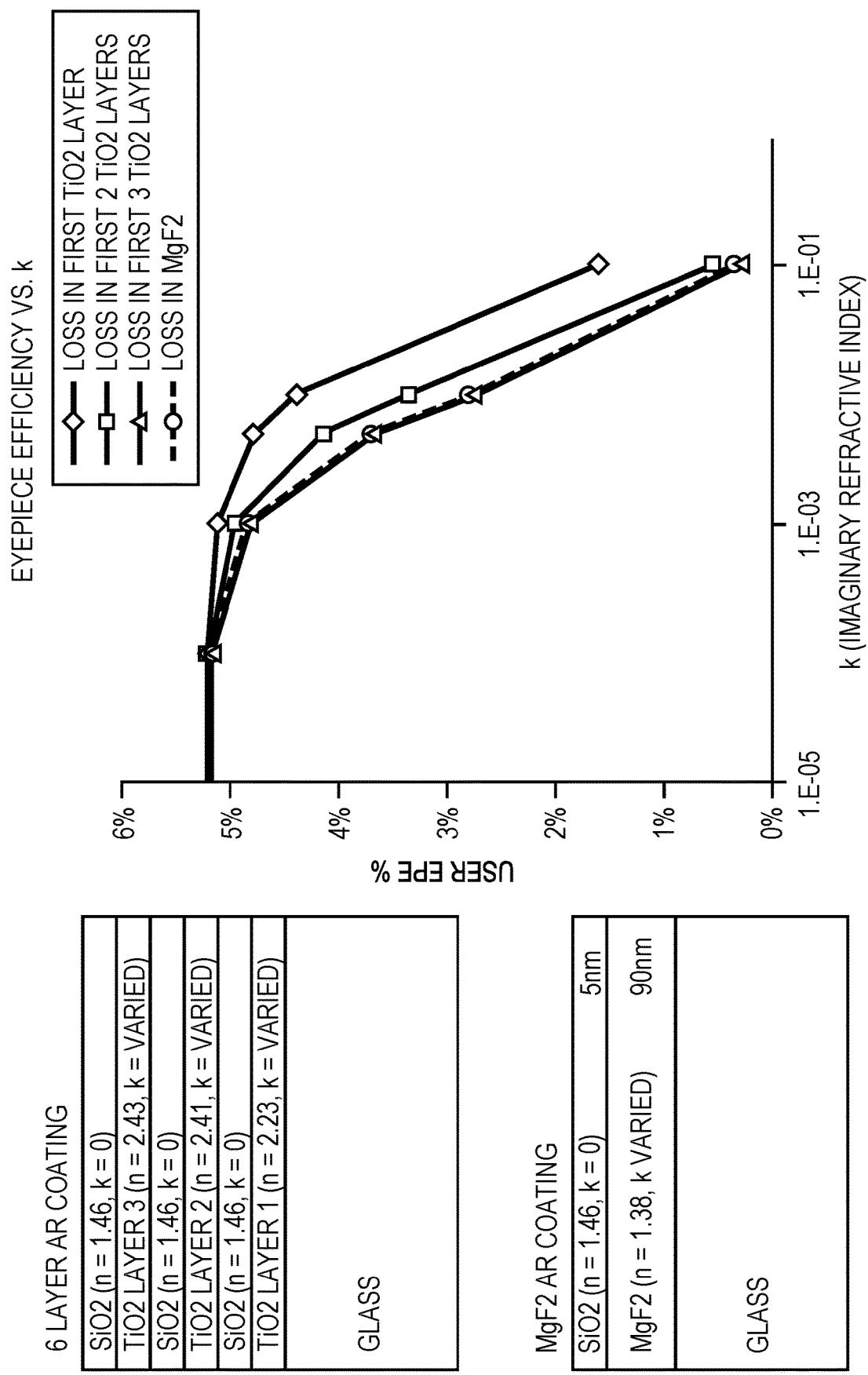
FIGS. 9A-9D are graphs that illustrate efficiency decay of light energy output by a waveguide as a function of the number of layers and k value of an anti-reflective coating according to some embodiments.
Figure 9B:
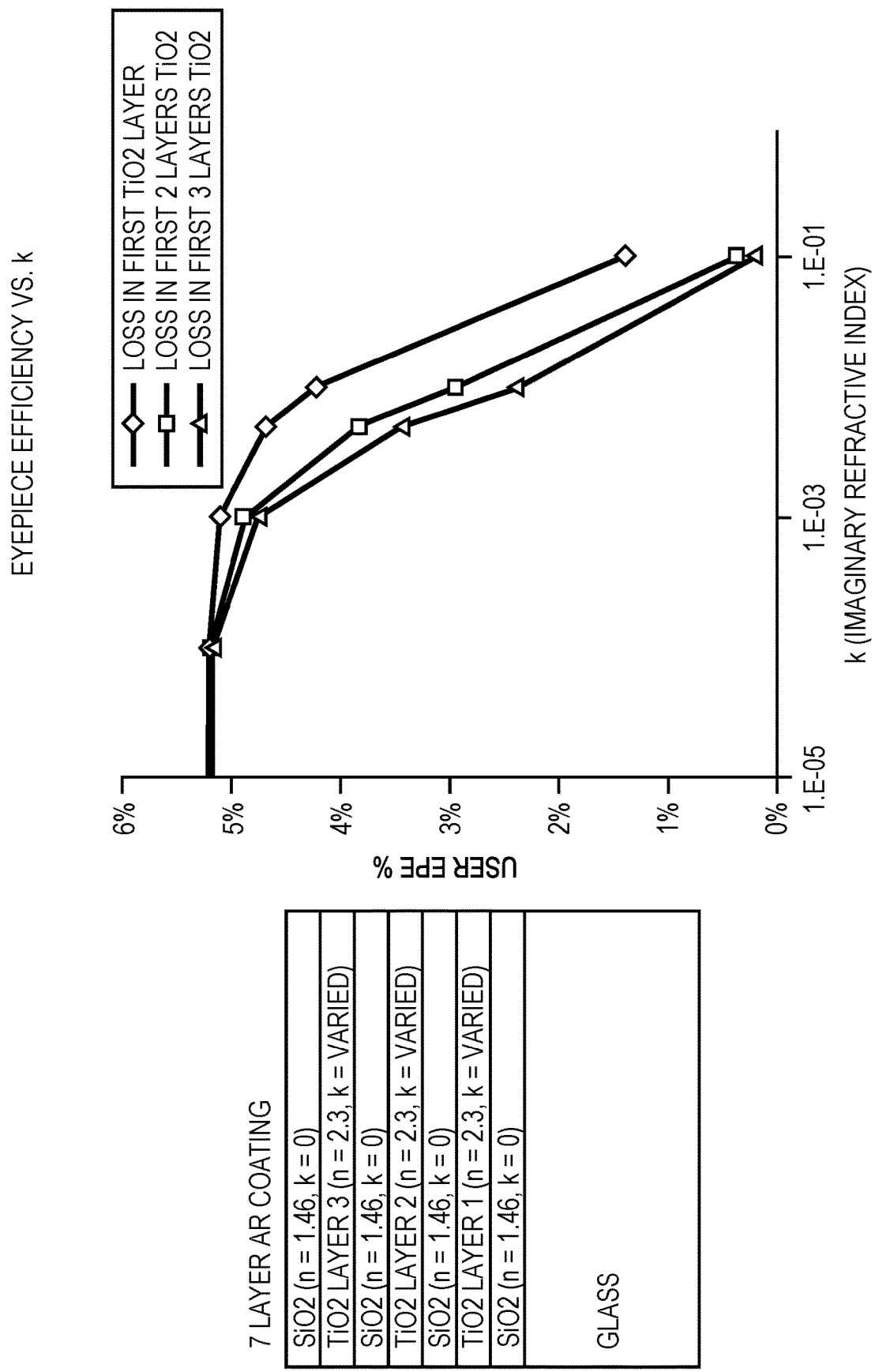
Figure 9C:
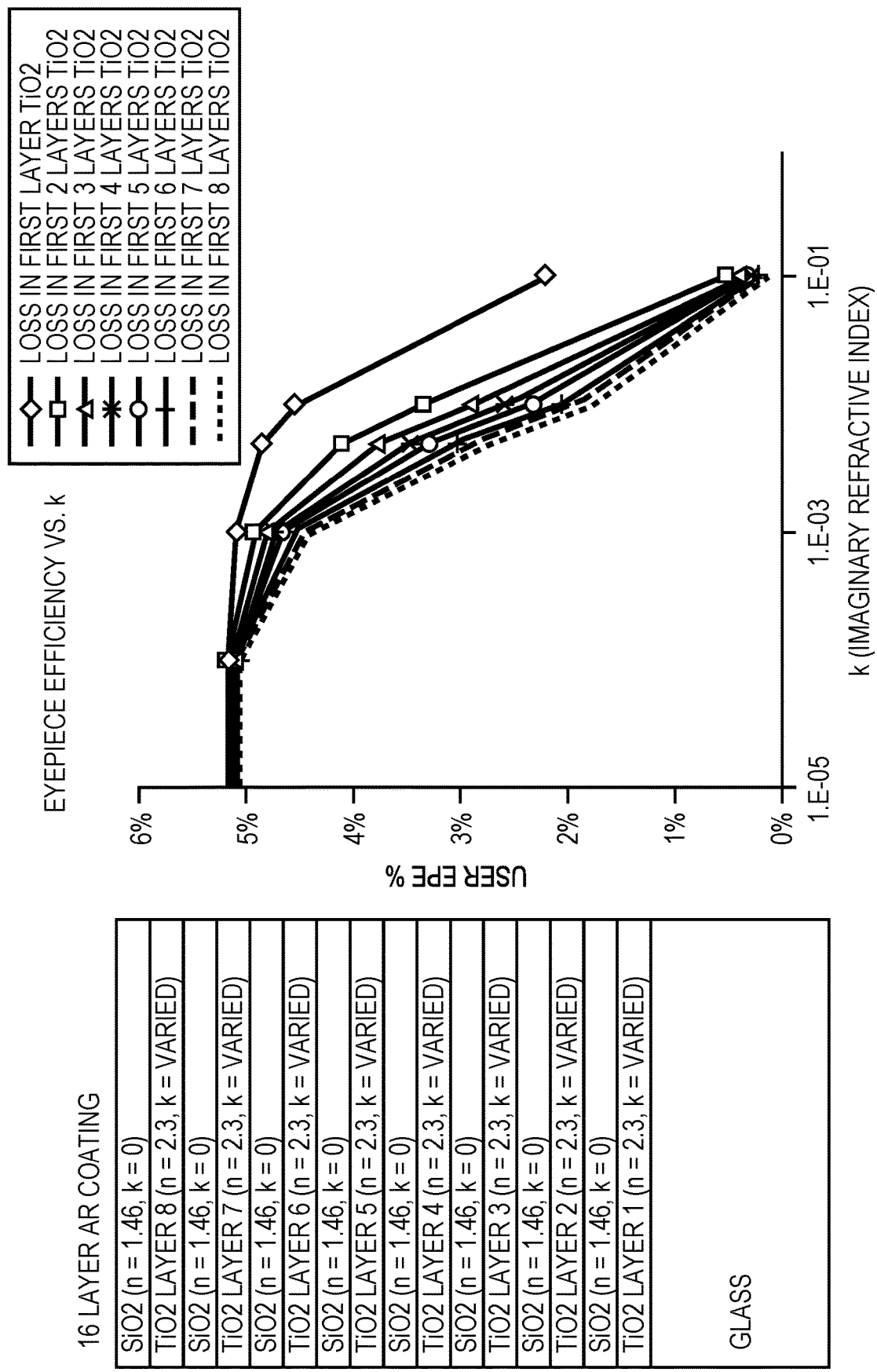

Using the energy output by materials of varying absorption coefficients k of various materials, the loss of light, as a percentage of output, is depicted in FIGS. 9A-9D. FIG. 9A depicts the loss of energy of light output by the EPE as a function of increasing layers and increasing k values. With an exemplary EPE efficiency of five percent as depicted, most single layer anti-reflective coatings preserve this efficiency in a TIR system, such as an optical waveguide, when the net k value is less than approximately $5 \times 10^{-4}$. Each additional layer or increase in net k value exponentially decays the efficiency of the energy output at the EPE. This is true regardless of the material or the number of layers, though the degree of decay changes as shown by FIGS. 9B and 9C.

Figure 9D:
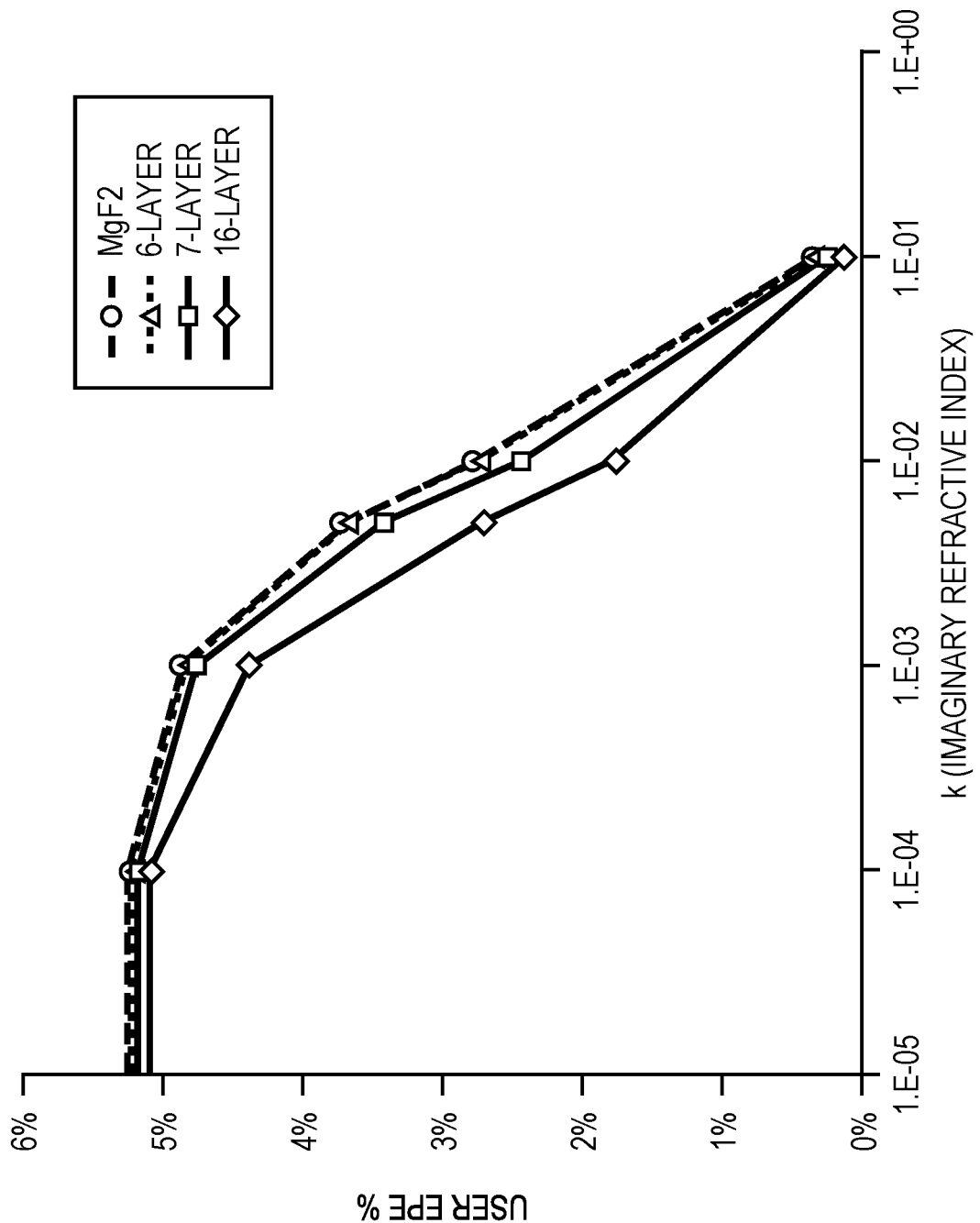

FIG. 9D depicts an EPE efficiency diagram demonstrating that increased layers, despite any benefits to anti-reflection known in the art, are detrimental to system performance through increased loss.

In some embodiments, anti-reflective coatings with fewer than eight layers are utilized. In some embodiments, such as an $MgF_2$ coating, only a single layer is utilized.

According to Eq. 1, a target index of refraction may be resolved by simple math, however the cumulative effect of a particular k value is not so easily derived, and in an alternating layer coating the cumulative target n may not be so straightforward either. For example, if a conventional anti-reflective coating material like titania were applied to a glass substrate, Eq. 1 would not be satisfied. Glass generally has an index of refraction between 1.5 and 1.6, an anti-reflective coating on glass therefore should have an index of refraction between 1.22 and 1.27. In some embodiments of the present invention, an antireflection coating of MgF2 is applied (the index of refraction of $MgF_2$ is 1.38) to a glass substrate.

With reference to FIG. 3, multiple waveguides may be used, such that each waveguide is configured to propagate a particular wavelength of light. A distinct thickness for an anti-reflective coating for each waveguide may be created based on the configured wavelength of that waveguide. For example, in a MgF2 coating on glass configured to propagate green light (approximately 520 nm), a thickness of 94 nm is desired. Alternatively, a common thickness for any waveguide (to save on manufacturing application complexity) between 75 nm and 125 nm can be applied for single layered coatings to reflect the visible spectrum generally, with the understanding that the exact thickness selected will be more beneficial for the particular wavelength of light dictated by Eq. 2.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Words using the singular or plural number also include the plural and singular number, respectively. Additionally, the words "herein," "above," and "below" and words of similar import, when used in this disclosure, shall refer to this disclosure as a whole and not to any particular portions of the disclosure.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

All of the references cited herein are incorporated by reference. Aspects of the disclosure can be modified, if necessary, to employ the systems, functions, and concepts of the above references to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. An anti-reflective waveguide, comprising:
a first planar waveguide substrate having first and second opposite surfaces and a first index of refraction;
a plurality of diffractive optical elements disposed upon the first surface of the first planar waveguide to diffract light in a first direction out of the first planar waveguide substrate towards a viewer and in a second direction into the first planar waveguide substrate away from the viewer;
an anti-reflective coating disposed upon the second surface of the first planar waveguide substrate through which the light refracted in the second direction leaves the first planar waveguide substrate with the anti-reflective coating increasing transmission through the second surface of the first planar waveguide substrate; and
a second planar waveguide substrate having first and second opposite surfaces and the first index of refraction, wherein the anti-reflective coating reduces reflection from and increases transmission of light through the second surface of the first planar waveguide substrate waveguide substrate into the second planar waveguide substrate.

2. The anti-reflective waveguide of claim 1, wherein the first planar waveguide substrate is configured to propagate light by total internal reflection between the plurality of diffractive optical elements and the anti-reflective coating in a substantially first direction, and outcouple light in a second direction substantially orthogonal to the first direction.

3. The anti-reflective waveguide of claim 2, wherein the light propagating by total internal reflection comprises an s polarization component and a p polarization component.

4. The anti-reflective waveguide of claim 3, wherein the anti-reflective coating is configured to reduce phase retardation between the two components such that an angle of incidence of the s component is substantially similar to that of the p component through the waveguide.

5. The anti-reflective waveguide of claim 1, wherein at least 97 percent of the light is transmitted through the second surface.

6. The anti-reflective waveguide of claim 3, wherein the first planar waveguide substrate is glass and the anti-reflective coating comprises a layer of $MgF_2$.

7. The anti-reflective waveguide of claim 6, wherein the layer of $MgF_2$ has a thickness between 75 and 125 nm.

8. The anti-reflective waveguide of claim 6, wherein the anti-reflective coating comprises a layer of $SiO_2$.

9. The anti-reflective waveguide of claim 7, wherein the layer of $MgF_2$ is disposed immediately adjacent to the second surface of the first planar waveguide substrate.

10. The anti-reflective waveguide of claim 9, wherein a layer of $SiO_2$ is disposed upon the layer of $MgF_2$.

11. The anti-reflective waveguide of claim 10, wherein a cumulative index of refraction of the anti-reflective coating has an imaginary refractive index component value less than $5 \times 10^{-4}$.

12. The anti-reflective waveguide of claim 10, wherein a cumulative index of refraction of the anti-reflective coating has an imaginary refractive index component value between $5 \times 10^{-4}$ and $1 \times 10^{-3}$.

13. The anti-reflective waveguide of claim 3, wherein the anti-reflective coating is comprised less than eight layers alternating between a first material and a second material.

14. The anti-reflective waveguide of claim 13, wherein the anti-reflective coating consists of four layers.

15. The anti-reflective waveguide of claim 13, wherein the first material has comparatively higher index of refraction than the second material.

16. The anti-reflective waveguide of claim 13, wherein the first material is $TiO_2$.

17. The anti-reflective waveguide of claim 13, wherein each layer of $TiO_2$ has an index of refraction greater than 2.

18. The anti-reflective waveguide of claim 13, wherein the second material is $SiO_2$.

19. The anti-reflective waveguide of claim 18, wherein each layer of $SiO_2$ has an index of refraction between 1.45 and 1.58.

20. The anti-reflective waveguide of claim 19, wherein a cumulative index of refraction of the anti-reflective coating has an imaginary refractive index component value less than $5 \times 10^{-4}$.

21. The anti-reflective waveguide of claim 19, wherein a cumulative index of refraction of the anti-reflective coating has an imaginary refractive index component value between $5 \times 10^{-4}$ and $1 \times 10^{-3}$.

22. The anti-reflective waveguide of claim 1, wherein a cumulative index of refraction of the anti-reflective coating has an imaginary refractive index component value less than $5 \times 10^{-4}$.

* * * * *